US012587597B2

(12) United States Patent (10) Patent No.: US 12,587,597 B2
Assis Dourado (45) Date of Patent: Mar. 24, 2026

(54) ALERT RINGTONE FOR URGENT MESSAGES

(71) Applicant: Naxos Finance SA, Luxembourg (LU)

(72) Inventor: Ana Flavia Assis Dourado, Milan (IT)

(73) Assignee: Naxos Finance SA, Luxembourg (LU)

( * ) Notice: Subject to any disclaimer, the term of this patent is extended or adjusted under 35 U.S.C. 154(b) by 472 days.

(21) Appl. No.: 18/003,603

(22) PCT Filed: Jun. 30, 2020

(86) PCT No.: PCT/IB2020/056190
§ 371 (c)(1),
(2) Date: Dec. 28, 2022

(87) PCT Pub. No.: WO2022/003398
PCT Pub. Date: Jan. 6, 2022

(65) Prior Publication Data
US 2023/0300237 A1 Sep. 21, 2023

(51) Int. Cl.
*H04M 19/04* (2006.01)
*H04M 1/72436* (2021.01)

(52) U.S. Cl.
CPC ..... *H04M 1/72436* (2021.01); *H04M 19/041* (2013.01)

(58) Field of Classification Search
CPC .......... H04M 1/72436; H04M 19/041; H04M 1/72457; H04M 1/72418
See application file for complete search history.

(56) References Cited

U.S. PATENT DOCUMENTS

2007/0116220 A1 * 5/2007 Eckel ...................... H04M 1/57
379/142.04
2013/0102287 A1 4/2013 Toksvig et al.

FOREIGN PATENT DOCUMENTS

CN 104 113 637 A 10/2014
GB 2 541 641 A 3/2017

OTHER PUBLICATIONS

International Search Report and Written Opinion dated Mar. 16, 2021, issued in PCT Application No. PCT/IB2020/056190, filed Jun. 20, 2020.

* cited by examiner

*Primary Examiner* — Joseph E Dean, Jr.
(74) *Attorney, Agent, or Firm* — Workman Nydegger

(57) ABSTRACT
The invention relates to a mobile communication apparatus and a method for receiving messages upon the arrival of a message flagged as "urgent", for automatically sounding an alert ringtone discernible from those assigned for other purposes, including those that various people may send and ring in the receiving mobile communication apparatus of the addressee. When changes occur in the ringtones due to the displacement of the mobile communication apparatus from one service area to another, by added new ringtones, the verification of the adequacy, if necessary, the updating of the alert ringtone is facilitated by a priori knowledge of the telecommunications networks with which the mobile communication apparatus is authorized to affiliate, obtainable from the data of the user identification modules (SIM, USIM, R-UIM, or the like), while ensuring a high probability to be heard, the alert ringtone may emit a few short rings and minimizing the disturbance by activation.

19 Claims, 2 Drawing Sheets

200

ALERT RINGTONE FOR URGENT MESSAGES

BACKGROUND OF THE INVENTION

1. The Field of the Invention

The present invention relates to a mobile communication apparatus and a method for receiving messages and, upon the arrival of a message flagged as "urgent" (also referred to as urgent message in the present description), emitting an alert ringtone discernible from ringtones assigned for other purposes, including those that various people may send and ring in the addressee's mobile communication apparatus.

2. The Relevant Technology

In the world of mobile communications several messaging services exist, such as SMS, MMS, WhatsApp, Instagram, Telegram, iMessage, Messenger, paging services (personal radio alerts) and the like, which make it possible to send text, voice or video messages to users equipped with suitable reception apparatuses. Generally, the addressee may display or listen to the messages immediately upon reception, or may decide to take them into consideration at a later time, depending on the activities he/she is engaged in. Because of this possibility, messages are often preferred over phone calls when one intends to cause the least disturbance to the addressee and the topic of the communication is brief and non-urgent.

In case of emergency, however, messages may be a vital resource if the addressee is not checking if there are any incoming communications, and in particular is not picking up phone calls, e.g., because he/she is participating in an important meeting or is in a place where no disturbance is allowed, or is far from his/her mobile communication apparatus (e.g., in another room).

Unfortunately, however, if the addressee is not answering phone calls, it is quite likely that he/she will not even look at an incoming message notified by a normal ringtone. It is therefore useful to be able to flag a message as urgent, so that the addressee can be alerted of an incoming urgent message in whatever situation he/she may find him/herself.

For emergency situations arising from catastrophic events (earthquakes, seaquakes, accidents and other similar events), special communication standards have been defined for alerting the populations involved. Generally, such systems do not permit the addressee to send an acknowledgment and are therefore unsuitable for informing a relative or a friend about a critical situation that demands an urgent answer or acknowledgment. For such needs, therefore, it is necessary to resort to different systems.

For example, modern smartphones are generally equipped with an "SOS function", through which it is possible to send an "SOS", i.e., a request for help or an urgent communication, to one or more contacts listed in the phone book of the mobile communication apparatus. This function permits ringing the called party's phone even when he/she has muted it, without however ensuring the discretion that may be appropriate in such circumstances, and with the risk that someone might unlawfully take advantage of this function to create undesired disturbance. In addition, especially if the addressee has not muted the phone, there is no assurance that the ringtone played upon the arrival of the urgent or SOS message will not be mistaken for another one, so that the urgency will not be perceived. Although the SOS function is not difficult to use, it nonetheless requires the execution of an activation procedure and the setting of a few parameters, which should be done a priori, and which might take too long in a situation of urgent need, particularly for those who are not very technologically inclined. The result is that the SOS function is very seldom used, and many people do not even know it exists.

Other methods that have been proposed for sending alert messages require complex procedures, such as managing secret keys, or may lend themselves to improper uses, or may imply the use of ringtones that are either very disturbing or do not ensure that they will be recognized as urgent alerts.

It must in fact be taken into account that, in addition to the numerous ringtones normally found in telecommunications devices and those created by the user, some telecommunications systems allow senders to send one or more proprietary ringtones, which will sound in the mobile communication apparatus of the addressee (see, for example, the 3GPP TS 23.040 V 15.3.0 standard about the "Technical realization of the Short Message Service", including the "Enhanced Messaging Service"). Among such senders there may be organizations of various nature, companies with commercial interests, and even the network operators themselves. Such ringtones may change over time and/or after the mobile communication apparatus moves from one place to another. There is a risk, therefore, that the alert ringtone set in the mobile communication apparatus might be mistaken for one of the other ringtones currently in use, and vice versa.

It is therefore important to take into account, when using an alert signal, that it will have to be reliably heard and recognized by the user of the receiving mobile communication apparatus, and also that it should not create excessive disturbance in the surrounding environment.

SUMMARY OF THE INVENTION

The present invention aims, therefore, at providing a mobile communication apparatus and a method according to which, upon receiving a message flagged as urgent, the addressee's mobile communication apparatus will play an alert ringtone that will be clearly discerned from those that such mobile communication apparatus may be able to activate for other purposes.

The present invention also aims at providing a mobile communication apparatus and a method for choosing, at least partly automatically, an alert ringtone that can be reliably heard by the addressee without creating much disturbance in the surrounding environment.

Furthermore, the present invention aims at providing a method executed by a receiving mobile communication apparatus, wherein one can classify as urgent text message or a video message including text, sent by means of any one of the messaging services known in the art, without the sender having to be equipped with a mobile communication apparatus with special features or applications.

Finally, the present invention aims at providing a mobile communication apparatus and a method for ensuring that an alert ringtone will be emitted in comfortable and safe conditions for the addressee.

The features of the present invention are more specifically set out in the appended claims.

BRIEF DESCRIPTION OF THE DRAWINGS

Such features as well as further advantages of the present invention will become more apparent from the following description of some embodiments thereof as shown in the annexed drawings, which are supplied merely by way of non-limiting example, wherein.

DETAILED DESCRIPTION OF THE PREFERRED EMBODIMENTS

In this description, any reference to "an embodiment" will indicate that a particular hardware and/or software configuration, structure or feature is comprised in at least one embodiment of the invention. Therefore, the expression "in an embodiment" and the like, which can be found in different parts of this description, will not necessarily refer to the same embodiment, since the various hardware and/or software configurations, structures or features described herein can be combined as deemed appropriate in one or more embodiments.

The alphanumerical references below only serve the purpose of allowing a better and easier understanding and shall not limit the protection scope or extent of the claimed embodiments.

In the present description, the term "ringtone" will refer to any signal, e.g., an audible signal, used as a message reception notification signal. According to techniques known in the art, said ringtone may be any notification signal, e.g., an audible one, adapted to notify the user that a message has been received.

Figure 1:
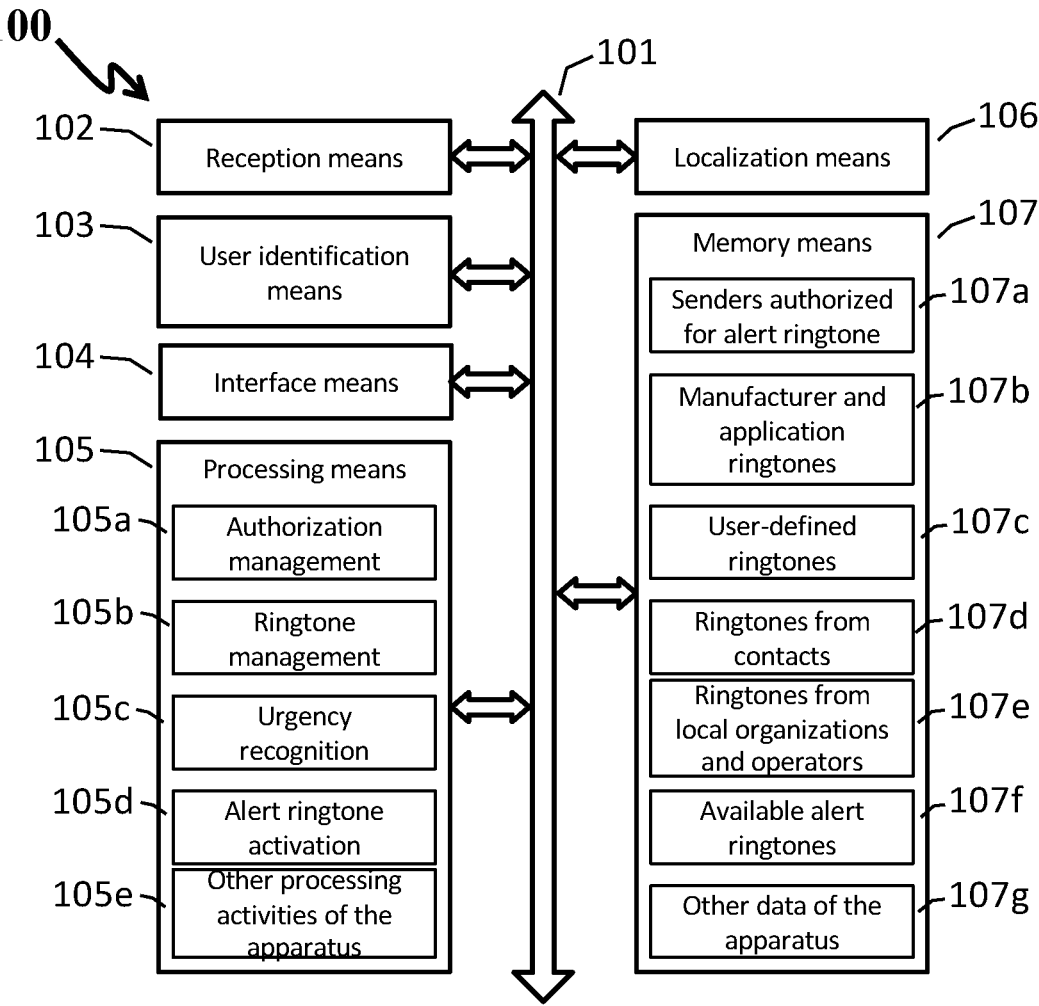
FIG. 1 schematically shows the architecture of a device implementing the invention in accordance with some aspects thereof.
Figure 2:
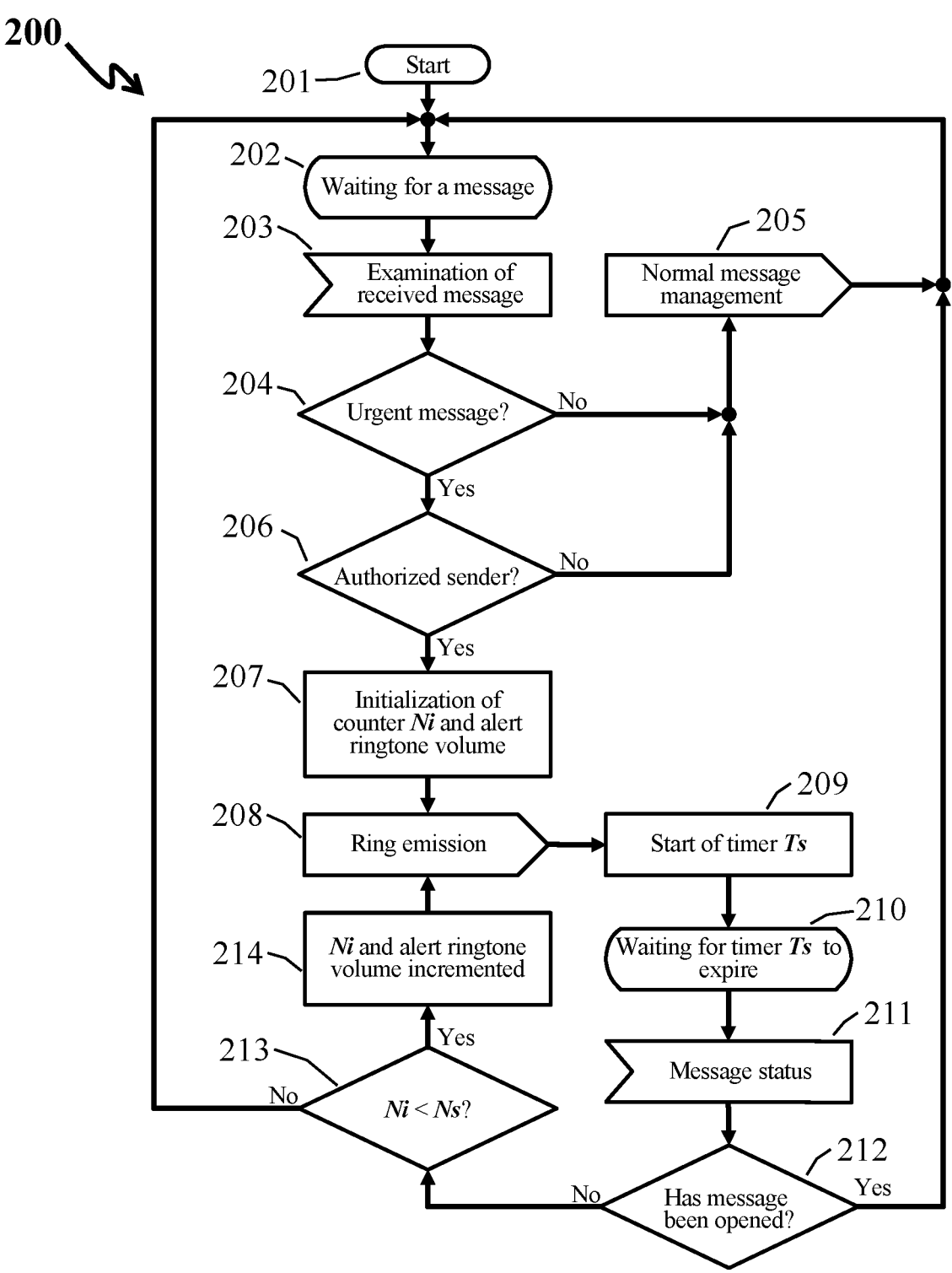
FIG. 2 shows a flow chart representing the main steps of an embodiment of a method according to the invention.

With reference to FIGS. 1 and 2, the following will describe a mobile communication apparatus 100 in accordance with some aspects of the present invention, the main elements of which, used in some embodiments of the present invention, comprise, among other things, the following components or parts:

a communication bus 101 for exchanging data and information between at least two elements of the mobile communication apparatus 100;

reception means 102 adapted to receive messages via a telecommunications network, not shown in the annexed figures for simplicity's sake;

user identification means 103 containing, among other data, the data identifying the user of the telecommunications service and the identifiers of the telecommunications network with which the mobile communication apparatus 100 is authorized to affiliate;

localization means 106 for the geographical localization of the mobile communication apparatus 100; in the following description, it is understood that such localization means may comprise satellite-based systems (GPS, Galileo), positioning systems based on Wi-Fi access points and cellular networks, and also those parts of the reception means of the mobile communication apparatus 100 which permit the extraction, from received signals, of identifiers and information concerning the service area and the zone where the mobile communication apparatus 100 is currently located, such as, e.g., in the case of cellular systems, the MCC (Mobile Country Code), the MNC (Mobile Network Code), the RSZI (Regional Subscription Zone Identity), the LAI (Location Area Identity), the RAI (Routing Area Identification), the BSIC (Base Station Identity Code), and the like;

interface means 104, e.g., a touchscreen, microphones, loudspeakers, push-buttons or the like, to allow interactions between the mobile communication apparatus 100 and the user;

memory means 107, e.g., a RAM, ROM, Flash memory or the like, capable of storing data and instruction sets implementing procedures or processes;

processing means 105 (e.g., a processing unit 105), such as, for example, a CPU (Central Processing Unit), for processing data and executing commands and instruction programs.

In particular, the mobile communication apparatus 100 according to an embodiment of the present invention is configured for receiving a radio signal from a telecommunications network comprising at least one message of either a first type or a second type. The first message type (also referred to as generic message) can be used for generic communications, whereas the second message type (also referred to as urgent message or a message "flagged" as urgent) can be used in relation to situations of urgency.

The memory means 107 can be configured for storing a plurality of ringtones (also referred to as "message reception notification signals" in the present description). In particular, the memory means 107 may comprise a first ringtone type (also referred to as generic ringtone), which is played upon reception of a generic message.

Since an urgent message is used in situations of urgency, it is appropriate that the reception of such a message is notified to the user as distinctly as possible from the reception of a generic message. To this end, the processing means 105 are configured for automatically selecting a second ringtone type (also defined as alert ringtone), different from the generic ringtone. In particular, the sound characteristics of the alert ringtone (e.g., frequency, pitch, timbre, etc.) must be such as to make said alert ringtone as discernible as possible from the generic ringtone. The processing means 105 are therefore configured for selecting an alert ringtone as a function of the ringtones comprised in the plurality of ringtones stored in the memory means 107.

After this selection process, the alert ringtone can be associated with urgent messages and played whenever an urgent message is received and/or accepted by the mobile communication apparatus 100. As an alternative or in addition, as will be further described in the present description, the alert ringtone may be selected as a function of the geographical position of the mobile communication apparatus 100.

In FIG. 1, by way of non-limiting example, in said processing means 105, and also in the memory means 107, some modules are represented to which reference will be made later on in this description to highlight the main functions of the present invention. They also include modules called "Other processing activities of the mobile communication apparatus 105*e*" and "Other data of the mobile communication apparatus 107*g*", which represent functions and data which are not used directly in order to implement the present invention, but which are used by the mobile communication apparatus 100 for other purposes.

A typical mobile communication apparatus to which the present invention can be applied is a telephone for cellular systems (GSM, CDMA, D-AMPS, GPRS, EDGE, UMTS, LTE and other systems currently under development, such as 5G or 6G). At some points of the present description reference may be made to such systems for simplicity's sake, but this does not imply that the application of the present invention is limited thereto. As will be apparent to a person skilled in the art, the present invention is also applicable to receiver apparatuses of professional communication systems (e.g., TETRA—TErrestrial Trunked RAdio) or private ones, or to receivers of paging devices (personal radio alerting), as well as to other types of receiver or transceiver apparatuses, such as personal computers (e.g., tablets or personal digital assistants) suitable for receiving messages over the telephone network. In all these types of apparatuses, the present invention can be advantageously implemented to peremptorily call attention upon the arrival of a message flagged as urgent.

The information useful for the implementation of the present invention can be obtained from the message received by the mobile communication apparatus 100 via the reception means 102, from the localization means 106, from the user identification means 103 and from the memory means 107.

From the received message, the mobile communication apparatus 100 can obtain the urgent or non-urgent classification of the message itself and the sender's identifier (e.g., his/her phone number). From the localization means 106 it can obtain information about its own geographical position, and from the user identification means 103, which may be, for example, a SIM (Subscriber Identification Module), a CSIM (CDMA Subscriber Identify Module), a USIM (Universal Subscriber Identity Module), an R-UIM (Removable User Identity Module) or other types of identification modules, the mobile communication apparatus 100 can obtain data identifying the telecommunications networks with which it is authorized to affiliate in various countries. Thanks to this information it is possible to know in advance some of the generic ringtones that may be sent to the mobile communication apparatus 100, and thus prepare one or more suitable alert ringtones among which one can be selected for use in the current location of the mobile communication apparatus 100. To this end, in the "Ringtones from local organizations and operators 107e" module of the memory means 107 a table can be stored which lists the ringtones that may be sent to the mobile communication apparatus 100 in the service areas of the networks with which it may affiliate, in accordance with the data contained in the user identification means 103. Depending on the processing capabilities of the processing means 105 and the connection capabilities of the communication means of the mobile communication apparatus 100, said table may be filled in at least partly automatically, retrieving the ringtones and the associated information via a telecommunications network and possibly interacting with the user through the interface means 104. In addition to those coming from operators and local institutions, these ringtones may also include ringtones of commercial companies and local service providers desiring to be recognized as the senders of their own communications by means of specific ringtones.

The memory means 107 may therefore be configured for comprising a table storing the associations between a plurality of geographical areas and a plurality of ringtones. The alert ringtone can be selected as a function of the geographical area where the mobile communication apparatus is currently located. In particular, the processing means 105 can find, through the localization means 106, a first geographical area being exited by the mobile apparatus and a second geographical area, different from the first geographical area, where the mobile apparatus comes to be located after moving, and consequently select the alert ringtone among the ringtones associated with said second geographical area.

Furthermore, the user identification means 103 can be configured for storing a piece of information concerning the association of each one of said geographical areas with at least one ringtone.

On the other hand, the processing means 105, and in particular the "Ringtone management 105b" module, by analyzing the contents of the memory of the mobile communication apparatus 100 and the applications installed therein, can identify and store:

into the memory module called "Manufacturer and application ringtones 107b", the ringtones provided by the manufacturer of the mobile communication apparatus 100 and those provided by the applications installed therein, into the memory module called "User-defined ringtones 107c", the ringtones retrieved or created by the user, and into the memory module called "Ringtones from contacts 107d", the ringtones that contacts included in its phone book may have sent to the mobile communication apparatus 100.

Based on such data, the user of the mobile communication apparatus 100 can, by interacting with the processing means 105 via the interface means 104, prepare and store into a table of the "Available alert ringtones 107f" module some alert ringtones suitable for use in one or more zones of the service areas in which the mobile communication apparatus 100 may come to be located. The replacement of the alert ringtone in use with another one which is more appropriate for the zone just entered by the mobile communication apparatus 100 may be carried out automatically by the processing means 105, which can correlate the zones with which said alert ringtones have been associated with the geographical position of the mobile communication apparatus 100 provided by the localization means 106, and hence set as the alert ringtone to be used one that will stand out from those intended for other purposes in the location where the mobile communication apparatus 100 is currently operating.

In some embodiments of the invention, prior to replacing one of such alert ringtones, the processing means 105 notify the user via the interface means 104 and wait for his/her consent.

To this end, before associating said alert ringtone with the urgent message type, the interface means 104 may be configured for receiving an authorization from the user of the mobile communication apparatus.

The message for which the sender requests the activation of an alert ringtone on the side of the receiving mobile communication apparatus may include, in some embodiments of the invention, a text component that allows the sender to flag it as urgent in a simple and intuitive manner, without having to resort to a particular procedure or use a particular application. In some embodiments, the receiving mobile communication apparatus may, in fact, consider as urgent a message whose textual part begins with the character string "URGENT", regardless of the use of uppercase or lowercase letters. In this way, the sender can simply add the word "urgent" or "very urgent" at the beginning of the text component of the message to request the activation of the alert ringtone.

It will be apparent to a person skilled in the art that many other strings may also be suitable for this purpose, and that several combinations or alternatives are also allowable. For example, a message may be considered as urgent both when it begins with the string "urgent", without being case-sensitive, and when it begins with the string "SOS" in uppercase letters. In this case, the sender may use different flags to assign the urgent classification to a message. It is also possible to flag an outgoing message as urgent by using the service data string that accompanies the text of the message, by entering a special flag that will be read and identified by the receiving mobile communication apparatus. The insertion of this flag may occur via the interface means of the sender's apparatus, e.g., through an icon (named "urgent") to be selected before or after writing the text message.

The message can then be sent via SMS or MMS or WhatsApp or Instagram or Messenger, or other messaging systems, without the sender having to use any specific application or to remember any particular procedure.

Although the alert ringtone that will now be described creates little disturbance in the surrounding environment, it is advisable to prevent any improper use thereof. Therefore, in some embodiments of the invention it can only be activated for messages coming from senders authorized beforehand by the addressee. In this case, the user of the mobile communication apparatus 100 can, through the "Authorization management 105*a*" module, define a group of "authorized" senders including those contacts whose messages flagged as urgent will be enabled to activate the alert ringtone. The definition of this group and the addition and removal of contacts to/from such a group can be done by the user of the mobile communication apparatus 100 at any time via a few simple steps, as is known to those skilled in the art.

The list of the senders enabled to activate the alert ringtone by sending a message flagged as "urgent" can be stored into the module 107*a* of the memory means 107.

In order to only allow authorized senders to play the alert ringtone, the processing means 105 can be configured for checking the sender's identity. In fact, the identity of the sender of an urgent message can be extracted by the mobile communication apparatus 100 directly from the urgent message received; the sender's identity can then be compared with the list of authorized senders contained in the module 107*a* of the memory means 107. The alert ringtone will then be played or not as a function of the result of such comparison. In particular, if such comparison has a positive outcome (i.e., if the sender of the urgent message is included in the list of authorized senders), then the mobile communication apparatus will play the alert ringtone; conversely, if the sender of the urgent message is not included in the list of authorized senders, then the communication apparatus 100 may automatically discard the message or, alternatively, notify the reception thereof by means of the generic ringtone.

Alternatively, or in combination with the aforementioned list of authorized senders, the invention foresees also the advantageous option to define the authorized senders automatically depending on the communication log of the mobile communication apparatus. In this case the automatic definition of authorized senders is preferably based on the number, frequency and/or duration of communication with certain senders having the highest values compared to other senders or exceeding a threshold and/or may be based on the presence of existing redundant data related to an specific sender in other applications of the mobile communication apparatus such as the calendar, email, contacts, tasks or the like, from which a trust level about the specific sender is derived and consequently the specific sender is automatically defined as authorized sender. As aforesaid, the ringtones that the mobile communication apparatus 100 can play are grouped, by way of illustrative and non-limiting example, into the blocks 107*b*, 107*c*, 107*d*, 107*e* and 107*f* of the memory means 107; such ringtones may undergo modifications over time, and some may be added to or removed from the existing ones or remain unused. According to the present invention, therefore, the "Ringtone management 105*b*" module can monitor the ringtones that are being actually used in the mobile communication apparatus 100 and can notify the user about any changes that may concern them. The user can, following such notifications and other changes that he/she may come to know about via other channels, or directly made by him/herself, verify whether the alert ringtone in use is still adequate or not and decide whether to keep it or replace it.

For example, when a mobile communication apparatus made in accordance with the present invention, in particular the mobile communication apparatus 100 for cellular networks, moves from a first country to a second country, the networks with which it can affiliate may change and so may, as a consequence, any ringtones that the operators of such networks and other organizations may send to the mobile communication apparatus 100. In the user identification means 103, which in this case may consist of a USIM or another type of module equivalent thereto as concerns the functions involved herein, one can find the list of the networks with which the mobile communication apparatus 100 is authorized to affiliate in said second country, and by means of this information the mobile communication apparatus 100 can retrieve, via communication means or from a table previously stored in the memory means 107, the ringtones that may be received from such networks. The user of the mobile communication apparatus 100 can thus compare these new ringtones with the alert ringtone in use, verify the discernibility of the latter, and decide whether to replace it or keep it in use.

In some embodiments of the present invention, the alert ringtone may, in some cases, be replaced automatically by the processing means 105. For example, if the mobile communication apparatus 100 moves to said second country, the "Ringtone management 105*b*" module may, by using the localization means 106 and the data stored in the memory means 107, verify if the move has occurred towards a zone for which an appropriate alert ringtone has already been prepared and stored into the "Available alert ringtones 107*f*" module, and verify if the conditions associated with that alert ringtones are still valid. If such conditions are still valid, the "Ringtone management 105*b*" module may automatically set said ringtone as the alert ringtone. In other embodiments of the invention, in the same situation the "Ringtone management 105*b*" module may, via the interface means 104, request the user to authorize the change, effecting such change only if the authorization is granted.

For this purpose, the automatic selection of the alert ringtone associated with a situation of urgency may be started when the user (or the operator with which the mobile apparatus is associated) updates the association between generic ringtones and generic messages.

Likewise, the automatic selection of the urgent ringtone may be updated when the mobile communication apparatus moves between distinct geographical areas.

Moreover, since adding or removing one or more ringtones to/from the memory 107 may jeopardize the discernibility of the alert ringtones from the generic ringtones, the selection of the alert ringtone may be updated whenever a ringtone is added to or removed from the memory 107.

In order to establish if the alert ringtone in use is still adequate after changes occurred to one or more ringtones that the mobile communication apparatus 100 can play, it will suffice to evaluate if it is still sufficiently discernible from such ringtones, because it can be assumed that it is already known to and appreciated by the user. This evaluation may be at least partly automated. To this end, in some embodiments of the invention the "Ringtone management 105*b*" module may be provided with a melody comparison algorithm, of a type similar to those that permit identifying a song from a few beats. Some examples of such algorithms can be found on the following Internet sites: "https://www.s-hazam.com/it", "https://www.midomi.com/", "http://www.musipedia.org/melody_search.html", "http://audiotag.info/index.php", and the like. In some embodiments of the invention, therefore, at least one of these algorithms may be used, possibly adapted for this specific application, in order to ascertain that the melody of the alert ringtone is discernible from the other ringtones in use or from new ringtones being added. If the melody is discernible, the user will be exempted from any verification, and the "Ringtone management 105*b*" module will be allowed to automatically confirm the alert ringtone in use.

In particular, in order to make an optimal selection of the alert ringtone, it is possible to determine, by means of a comparison algorithm, at least one correlation parameter between the generic ringtone and each one of the alert ringtones stored in the memory 107; for example, according to techniques known in the art, the correlation parameter may be used for expressing the degree of similarity between two ringtones. The alert ringtone, associated with urgent communications, can thus be selected as a function of such correlation parameter; in particular, the selected alert ringtone will be one having a low degree of similarity with the generic ringtone.

If, on the contrary, melody discernibility is not ensured, the "Ringtone management 105*b*" module may notify the user about the similar ringtones, leaving it up to the user to decide what action to take. Notwithstanding the similarities between the melodies, the user may in fact decide to keep the alert ringtone in use because he/she will still be able to discern it due to other characteristics thereof, such as a different timbre (piano, violin, trumpet, etc.), a different rhythmic combination, a different octave, a different key, or the like.

The automatic verification of the discernibility of the melodies is also advantageous in circumstances wherein the user must choose a new alert ringtone, because this may allow the user to try and set a melody that he/she likes and leave it up to the processing means 105 to verify its discernibility from the numerous ringtones already present in the mobile communication apparatus 100.

In addition to the above-mentioned possible distinctive elements, according to the present invention, the alert ringtone may also be discerned from other ringtones for its mode of activation.

In some embodiments of the invention, in fact, it may consist of just a few rings (e.g., one or two rings). In this case, as a type of message reception notification signal, said few short rings may be those that the mobile communication apparatus (100) plays when it receives a vocal phone call. This feature may significantly contribute to discerning the alert ringtone (the ringtone activated by an unanswered phone call or message is unlikely to last only a few rings) and also to minimizing the disturbance that it might create.

As a variation of this type of activation, in some embodiments of the invention such short rings can be repeated at regular time intervals lasting a value Ts sufficient to allow the user to open the message. The repetition may continue until the message is opened or until the number of repetitions of alert signals reaches a maximum value Ns.

For this purpose, the generic ringtone may be played for a first predetermined time interval upon reception of a generic message, while the alert ringtone may be played for a second predetermined time interval upon reception of an alert message; in order to allow the user to discern the generic ringtone even more distinctly from the alert ringtone, the first predetermined time interval may be different (greater or smaller) than said second predetermined time interval.

Likewise, the generic ringtone may be played for a first predetermined number of times upon reception of a generic message, while the alert ringtone may be played for a second predetermined number of times upon reception of an urgent message; in order to allow the user to discern the alert ringtone even more distinctly from the generic ringtone, the first predetermined number of times may be different (greater or smaller) than said second predetermined number of times.

Furthermore, in order to maximize the probability that the user will be actually notified about the arrival of an urgent message, the reproduction of the alert ringtone may be repeated until the urgent message is opened by the user.

In some embodiments, the first emission of said short rings may occur at a low, but still audible, volume, whereas the volume of the next rings may be gradually increased.

The volume may be increased by constant intensity steps in a linear scale, or by constant intensity steps in a logarithmic scale (decibels), or by other types of constant or variable increments. In this way it is possible to minimize the disturbance that the alert ringtone may create, while still ensuring a high probability that it will be heard.

In this and other embodiments, the volume of the rings of the alert ringtone may be independent of the settings made for other sounds that the mobile communication apparatus 100 can emit, including the muting of ringtones that the user may select when he/she does not want to create a disturbance.

The flow chart of FIG. 2 summarizes the above-described method for activating the alert ringtone.

Once started (step 201), the method goes to step 202 of waiting for a message.

Upon receiving a message by the reception means 102, the method goes on to step 203 of examining the characteristics of the received message, wherein the processing means 105, in co-operation with the reception means 102, identify the sender of the message and the "Urgency recognition 105*c*" module establishes whether the received message contains an urgency flag or not. In the next decisional step 204, if the message is not urgent, the normal message management procedure 205 is executed, after which the method returns to the message waiting step 202.

Conversely, if in the decisional step 204 the message turns out to be flagged as urgent, the method goes to step 206, wherein it is determined whether the sender of the message is authorized or not to cause the activation of the alert ringtone. If the sender is not authorized, the method goes to the normal message management procedure 204 and then waits for a new message (step 202). Otherwise, if the sender is authorized to cause the activation of the alert ringtone, the method goes to step 207, wherein the processing means 105 initialize to one a counter Ni of the activations of alert signals (composed of one or more rings) and initialize the ringtone volume to the level assigned to the first ring, thus bypassing any other ringtone settings that may currently be active in the receiving mobile communication apparatus

100. The ring activation step 208 is then carried out, wherein the "Alert ringtone activation 105d" module commands the emission of an alert signal (composed of one or more rings) via the interface means 104.

Step 208 is followed by step 209, wherein the processing means 105 start the timer Ts, the duration of which, as aforesaid, is sufficient to allow the user of the mobile communication apparatus 100 to open the received message.

In step 210 the method waits for the timer Ts to expire, and in the next step 211 the processing means 105 detect the status of the message. If in the next decisional step 212 it is ascertained that the message has been opened, the method goes back to the step of waiting for a new message 202, otherwise it goes to the decisional step 213, wherein the processing means 205 verify if the number Ni of alert signals (composed of one or more rings) emitted has reached the maximum number Ns.

If the maximum number of alert signals Ns has been reached, the method goes back to the step of waiting for a new message 202, otherwise it goes to step 214, wherein the processing means 105 increment the alert signal counter Ni by one unit and increment the volume of the alert ringtone by a predefined value.

From step 214, the method then goes back to step 208, emitting a new alert signal (composed of one or more rings) at a higher volume.

The present invention offers, therefore, several advantages over the prior art.

According to the invention, upon receiving a message flagged as urgent, the addressee's mobile communication apparatus automatically emits an alert ringtone that can be clearly and reliably discerned from the other ringtones in use in such mobile communication apparatus, even if there are many of them and they can change over time and as the mobile communication apparatus moves between different service areas where various entities may send proprietary ringtones to be emitted by the receiving mobile communication apparatus.

Discernibility can be verified automatically for the most part, both when an alert ringtone is initially chosen and when changes occur in the ringtones in use, thus exempting the user from having to make many tedious comparisons.

Even in circumstances wherein the addressee of an urgent message has muted the ringtones to avoid creating a disturbance, the present invention makes it possible to automatically sound a particular alert ringtone that will create minimal disturbance, while still ensuring a high probability that it will be heard by the addressee.

A contribution to disturbance minimization is also given by the fact that the alert ringtone can only be activated for messages flagged as urgent coming from senders authorized beforehand by the addressee, while the urgent classification can be attributed in an extremely simple and intuitive way on the sender's side, without the sender having to use a particular mobile communication apparatus or a particular application.

Some of the possible variants of the invention have been described above, but it will be clear to those skilled in the art that other embodiments may also be implemented in practice, wherein several elements may be replaced with other technically equivalent elements. The present invention is not, therefore, limited to the above-described illustrative examples, but may be subject to various modifications, improvements or replacements of parts and equivalent elements without however departing from the basic inventive idea, as specified in the following claims.

The invention claimed is:

1. A mobile communication apparatus comprising:
reception means adapted to receive a radio signal from a telecommunications network, said radio signal comprising at least one message, said at least one message being of either a first message type or a second message type, said second message type being associated with a situation of urgency while said first message type is not associated with a situation of urgency;

localization means adapted to determine a geographical position of the communication apparatus;

memory storing a plurality of message reception notification signals, said plurality of message reception notification signals comprising at least one signal of a first type of message reception notification signal that is associated with said at least one message of said first message type, and a plurality of signals of a second type of message reception notification signal each being associated with said at least one message of said second message type;

a processor operatively connected to said reception means, said localization means, and said memory;

wherein said processor is configured for executing the following steps:

automatically selecting a first signal from the plurality of signals of said second type of message reception notification signal, the first signal of said second type of message reception notification signal being selected as a function of the at least one signal of said first type of message reception notification signal and/or as a function of a geographical position of the communication apparatus;

associating said first signal of said second type of message reception notification signal with said at least one message of said second message type;

receiving said at least one message of said second message type via said reception means;

playing, at a first volume level, said first signal of said second type of message reception notification signal following the reception of said at least one message of said second message type.

2. The mobile communication apparatus according to claim 1, wherein said step of selecting a first signal of said second type of message reception notification signal comprises the following steps:

determining, through an algorithm for comparing message reception notification signals, at least one correlation parameter between said at least one signal of said first type of message reception notification signal and each one of the message reception notification signals of said second type of message reception notification signal comprised in said plurality of message reception notification signals;

selecting said first signal of said second type of message reception notification signal as a function of said correlation parameter.

3. The mobile communication apparatus according to claim 1, further comprising interface means configured for:

sending a piece of information to the user in relation to two or more message reception notification signals among the plurality of message reception notification signals, said two or more message reception notification signals being characterized by a correlation parameter evaluating the discernibility thereof;

receiving from the user, via said interface means, a command for selecting one message reception notification signal comprised in said two or more message reception notification signals;

associating the message reception notification signal selected by the user with said message of said second message type.

4. The mobile communication apparatus according to claim 1, wherein said memory is configured for storing a plurality of geographical areas, each one of said geographical areas being associated with at least one signal of said second type of message reception notification signal, and wherein said processing means are further configured for:

identifying, through said localization means, a first geographical area exited by the mobile apparatus and a second geographical area entered by the mobile apparatus after moving, said second geographical area being different from said first geographical area;

selecting a second signal of said second type of message reception notification signal and associating said second signal of said second type of message reception notification signal with said second geographical area.

5. The mobile communication apparatus according to claim 1, further comprising identification means, said identification means comprising at least one telecommunications network identifier with which said mobile communication apparatus is authorized to affiliate and receive said radio signal, said network identifier being used for determining the choice of the notification signal comprised in said second type of message reception notification signal.

6. The mobile communication apparatus according to claim 5, wherein said identification means are further configured for storing information about the association of each one of said geographical areas with at least one signal of said second type of notification signal.

7. The mobile communication apparatus according to claim 1, wherein:

said signal of said first type of message reception notification signal is played for a first predetermined time interval following the reception of said first message type;

said first signal of said second type of message reception notification signal is played for a second predetermined time interval following the reception of said second message type;

said first predetermined time interval is different from said second predetermined time interval.

8. The mobile communication apparatus according to claim 1, wherein:

said signal of said first type of message reception notification signal is played for a first predetermined number of times following the reception of said first message type;

said first signal of said second type of message reception notification signal is played for a second predetermined number of times following the reception of said second message type;

said first predetermined number of times is different from said second predetermined number of times.

9. The mobile communication apparatus according to claim 7, wherein said processing means are configured for:

interrupting the reproduction of said first signal of said second type of message reception notification signal at the end of said second predetermined time interval or after said second predetermined number of times;

repeating the reproduction of said first signal of said second type of message reception notification signal at a second volume level, if in the meantime said second message type associated with a situation of urgency has not been opened.

10. The mobile communication apparatus according to claim 9, wherein said first volume level is lower than said second volume level.

11. The mobile communication apparatus according to claim 1, wherein said step of automatically selecting a signal of said second type of message reception notification signal is started after one or more of the following events:

execution or update of the association between said signal of said first type of message reception notification signal and said first message type;

movement of the mobile communication apparatus between distinct geographical areas;

addition or removal of one or more of said signals of said first type of message reception notification signal and/or said second type of message reception notification signal in said plurality of said message reception notification signals.

12. The mobile communication apparatus according to claim 1, wherein said interface means are configured for receiving, from a user of the mobile communication apparatus, an authorization to associate said at least one signal of said second type of message reception notification signal with said second message type, if the latter comes from a sender authorized to activate said at least one signal of said second type of message reception notification signal.

13. The mobile communication apparatus according to claim 12, wherein said interface means are further configured for assigning to at least one contact comprised in a phone book of the mobile communication apparatus an authorization to associate said at least one signal of said second type of message reception notification signal with said second message type.

14. The mobile communication apparatus according to claim 1, wherein:

said memory is further configured for storing manually or automatically a plurality of senders authorized to cause the emission of said at least one signal of said second type of message reception notification signal;

said processor is configured for:

receiving said second message type via said reception means;

extracting sender identification information from said second message type;

making a comparison between said sender identification information and said plurality of authorized senders;

reproducing said at least one signal of said second type of message reception notification signal as a function of the positive outcome of said comparison.

15. A method for selecting a message reception notification signal associated with a situation of urgency in a mobile communication apparatus, said mobile communication apparatus comprising:

reception means adapted to receive a radio signal from a telecommunications network, said radio signal comprising at least one message, said at least one message being either a first message type or a second message type, said second message type being associated with a situation of urgency while said first message type is not associated with a situation of urgency;

localization means adapted to determine the geographical position of the communication apparatus;

memory storing a plurality of message reception notification signals, said plurality of message reception notification signals comprising at least one signal of a first type of message reception notification signal and a plurality of signals of a second type of message reception notification signal, said at least one signal of said first type of message reception notification signal being associated with said first message type and said plurality of said second type of message reception notification signals being associated with said second message type;

a processor operationally connected to at least said reception means, said localization means, and said memory;

said method being carried out by said processor performing the following steps:

selecting a first signal from the plurality of signals of said second type of message reception notification signal, said selected first signal of said second type of message reception notification signal being selected as a function of said at least one signal of said first type of message reception notification signal and/or as a function of the geographical position of the communication apparatus;

associating said first signal of said second type of message reception notification signal with said second message type.

16. The method according to claim 15, wherein the first signal of said second type of message reception notification signal is selected as a function of the geographical position of the communication apparatus.

17. The method according to claim 16, wherein the method further comprises the processor selecting the first signal of said second type of message reception notification signal when the communication apparatus is at a first geographical position and the processor selects a second signal from the plurality of signals of said second type of message reception notification signal when the communication apparatus is at a second geographical position different from the first geographical position, the second signal of said second type of message reception notification signal being selected as a function of the geographical position of the communication apparatus.

18. The mobile communication apparatus according to claim 1, wherein the first signal of said second type of message reception notification signal is selected as a function of the geographical position of the communication apparatus.

19. The mobile communication apparatus according to claim 18, wherein the processor is configured to select the first signal of said second type of message reception notification signal when the communication apparatus is at a first geographical position and the processor is configured to select a second signal from the plurality of signals of said second type of message reception notification signal when the communication apparatus is at a second geographical position different from the first geographical position, the second signal of said second type of message reception notification signal being selected as a function of the geographical position of the communication apparatus.

* * * * *